United States Patent Office 2,758,320
Patented Aug. 14, 1956

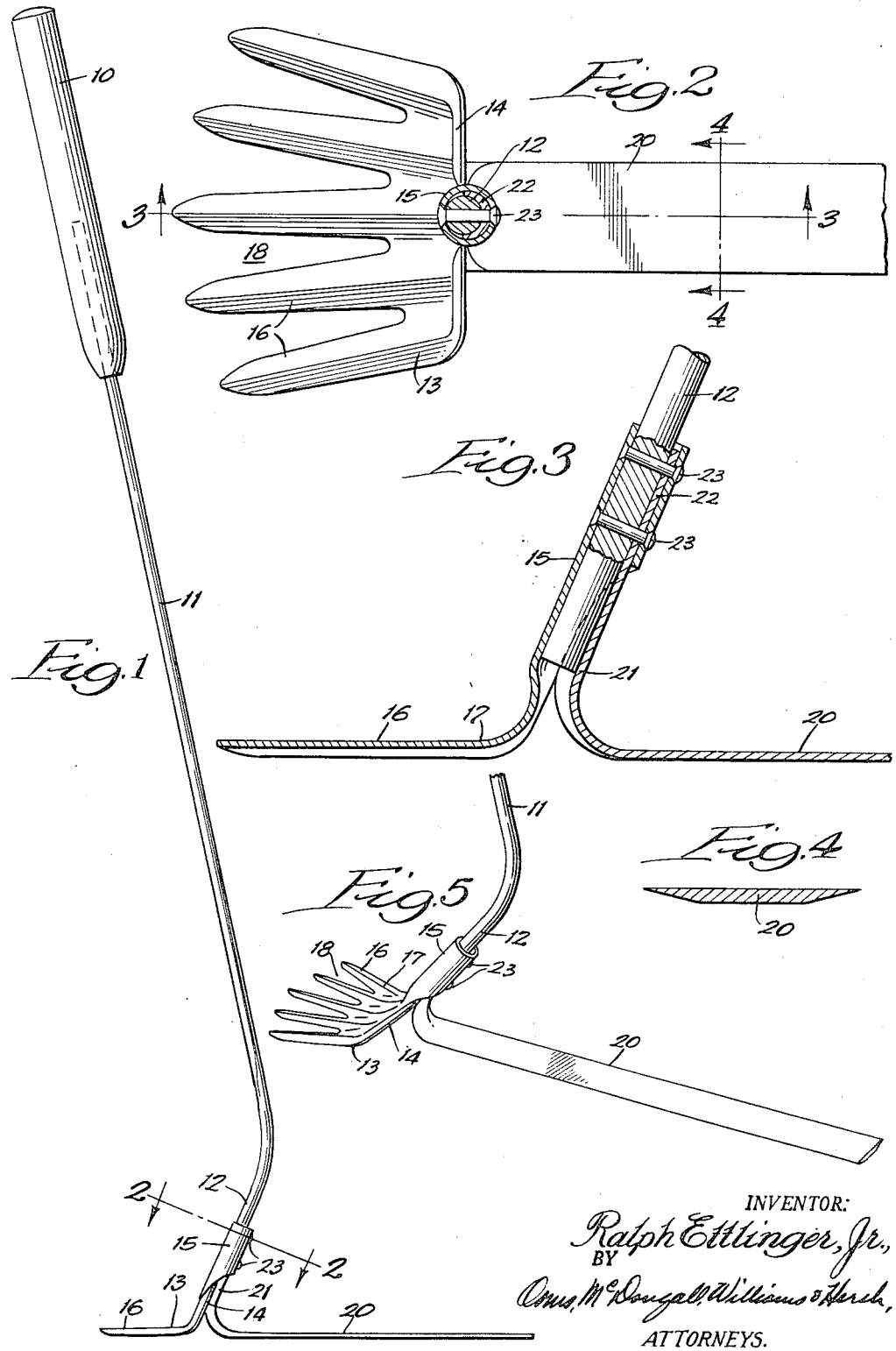

2,758,320

CRAB GRASS WEEDER

Ralph Ettlinger, Jr., Highland Park, Ill.

Application February 24, 1953, Serial No. 338,492

5 Claims. (Cl. 7—14.1)

This invention relates to a weeding tool and it relates more particularly to a tool for use in the elimination of crab grass, quack grass, devil grass and the like. Because of the nature of the growth of these grasses close to the surface of the earth, it is difficult to effect even partial elimination thereof as an incidence to the normal mowing operation periodically employed to cut down the blades of the grass. As a result, the crab grass is able rapidly to spread over the surface of the soil with little, if any, interference to the end that growth thereof flourishes while the lawn grass is slowly displaced to the end that the lawn soon becomes covered with crab grass.

Various chemical and mechanical means have been developed in the attempt to destroy the presence and prevent the spread or growth of crab grass in lawns. Use is made of solutions of cyanates and other chemicals to eliminate crab grass and the growth thereof but these are effective mostly against seedlings and not against mature crab grass and unless extreme care is exercised in their use, the desirable grass is also harmed to the extent that the entire lawn may be destroyed or irreparably damaged and the soil contaminated to the extent that resodding becomes difficult.

Elimination by mechanical or physical means is difficult by reason of the fact that the crab grass spreads rapidly in all directions with runners that stay close to the ground. It becomes necessary to ferret out the shoots by hand or employ some tool which is capable of penetrating beneath the shoots of the crag grass without disturbing the surface of the soil or the grass growing in the vicinity thereof. To the present, the tools which have been developed have been incapable of use to guide the ferreting members smoothly over the surface of the ground to undermine the crab grass so that substantially the entire growth can be raised above the level of the grass for elimination by means of a mower.

It is an object of this invention to produce a crab grass weeder of the type described, and it is a related object of this invention to produce a weeder having a series of ferreting blades, guide means cooperating with the blades for movement smoothly over the surface of the soil to undermine the crab grass and means forming a part of the guide for severing the raised crab grass as closely as possible to the surface of the soil.

These and other objects and advantages of this invention will hereinafter appear and for purposes of illustration, but not of limitation, an embodiment of the invention is shown in the accompanying drawing in which—

Figure 1 is a side elevational view of a crab grass weeder embodying features of this invention;

Figure 2 is a sectional view taken substantially along the line 2—2 of Figure 1;

Figure 3 is a sectional elevational view taken along line 3—3 of Figure 2;

Figure 4 is a sectional elevational view taken along the line 4—4 of Figure 2, and Figure 5 is a perspective view of the weeder head embodying features of this invention.

As shown in the drawing, a crab grass weeder embodying features of this invention comprises a handle 10 having a shaft in the form of an elongate rod 11 connected to the lower end thereof and which, when in position of use, is adapted to be vertically disposed at a slight rearward tilt in the vertical plane. The lower end portion 12 of the shaft onto which the weeder head is mounted is turned forwardly in the same plane opposite the direction of tilt of the remainder of the shaft to an angle off the perpendicular by an amount corresponding to the remainder of the shaft but in the opposite direction.

The weeder head comprises a forwardly extending ferreting member in the form of a plate having a body portion 13 which is bent through an intermediate section thereof to provide a rearward portion 14 extending upwardly at an angle corresponding to that of the end 12 of the rod 11 and having a portion 15 at the end which wraps around the end of the rod to effect an assembled relation. The remainder of the body portion is horizontally disposed to lie parallel with the surface of the earth when in position of use and is formed with a plurality of forwardly extending fingers 16 which diverge from the forward edge of the body portion 17 to provide a plurality of substantially curvilinear V-shaped sections 18 in which the crab grass may be confined and concentrated towards the base of the V as the ferreting portion is advanced over the surface of the soil. The prongs or fingers 16 may be formed to be perfectly flat or rounded in cross section to facilitate their passage through the grass and beneath the shoots of the crab grass when in use.

To assist in proper alignment of the ferreting portion with respect to the surface of the earth thereby to avoid digging into the earth and consequent dislodgment of sod or disturbance of the soil and, at the same time, to prevent the prongs from being positioned at an upward tilt which would prevent insertion beneath the shoots of the crab grass, a guide member is provided in the form of an elongate blade 20 which extends rearwardly in aligned parallel relation with the horizontally disposed ferreting end portion of the head. In effect, the important feature resides in the combination of the fingers 16 and the guide 20 whereby the fingers 16 extend horizontally at least at their tip portion while the member 20 also extends horizontally in the plane of the fingers whereby the fingers may be pressed down against the ground and be drawn forwardly with the blade 20 as a guide to extend the fingers under the crab grass runners. The elongate guide member is preferably formed of metal and has a forward end portion 21 turned upwardly and back to be disposed at an angle substantially corresponding to that of the forwardly turned end portion 12 of the shaft with the end flattened and dimensioned to permit it to be partially wrapped about the shaft as shown more specifically in Figure 2.

In addition to its function as a guide for the ferreting member, the lateral edges of the elongate guide 20 may be sharpened for use in cutting the crab grass raised by the ferreting member, preferably using the ferret as the pivot to achieve severance as close to the surface of the earth as possible without danger of injury to the earth or objects positioned near by as would occasionally result from the use of a scythe.

While various means of assembly may be employed, it is preferred for purposes of rapidity and economy to form the upturned ends of the guide with a flattened portion 22 dimensioned to wrap around about one-half but less than all the way about the shaft while the end portion of the ferreting member is preferably dimensioned to wrap completely about the blade and the end portion 22 of the guide so as to embrace the entire assembly whereby permanent attachment may be effected by means of rivets 23 or by welding through from the rear to front to secure the surfaces together in contacting relation.

It will be apparent from the description and from the drawing that the crab grass weeder described provides for balance in construction and weight which facilitates handling and operation thereof in use. The shaft is aligned with an intermediate portion of the elongate guide member and intersects the aligned guide member and ferreting member rearwardly of the latter so as to enable the tool to be in proper balance when held in the most comfortable position and with the members aligned over the surface of the earth.

It will be understood that changes may be made in the details of construction, arrangement and operation without departing from the spirit of the invention, especially as defined in the following claims.

I claim:

1. A crab grass weeder comprising a head including a ferreting member formed of a relatively flat plate of rigid material having a forwardly extending horizontally disposed portion adapted to lie flat over the surface of the soil when in position of use and a rearwardly extending upturned portion, a plurality of fingers extending horizontally forwardly from the forward edge of the plate in divergent angular relation with each other to form V-shaped spaces therebetween, a guide member cooperating with the ferreting member having an elongate blade extending rearwardly in aligned parallel relation with the horizontally disposed forward end portion of the plate and in the plane of the fingers of the ferreting member whereby the tip portions of the fingers which extend horizontally in the plane of the guide can be pressed down against the ground and be drawn forwardly to extend under the crab grass runners and having a forward end portion turned upwardly to extend in a direction parallel to the upturned end portion of the ferreting member, an elongate handle having a lower end portion turned to extend in parallel relation with the upturned members of the ferreting member and the guide member when in position of use, and means securing the upturned end portions of the ferreting and guide members onto the end of the handle.

2. A crab grass weeder as claimed in claim 1 in which the lateral edges of the guide blade are sharpened for cutting purposes.

3. A crab grass weeder as claimed in claim 1 in which the angle between the upturned end portion and the horizontally disposed portion of the ferreting member is obtuse while the angle between the upturned end portion and the horizontally disposed portion of the blade is acute.

4. A crab grass weeder as claimed in claim 1 in which the upturned end portion of the guide is dimensioned to wrap partially about the end of the handle and in which the upturned end portion of the ferreting member is dimensioned to wrap fully about the handle with the end portion of the guide also wrapped thereon, and means joining the adjacent portions wrapped around the handle into a fixed assembled relation.

5. A crab grass weeder comprising the combination of a head including a ferreting member formed of a relatively flat plate of rigid material having a forwardly extending horizontally disposed portion adapted to lie over the surface of the soil when in position of use and a rearwardly extending upturned portion, a plurality of fingers extending horizontally forwardly from the edge of the plate in divergent angular relation with each other to form V-shaped spaces therebetween with the tips of the fingers extending in a horizontal direction, and a guide member cooperating with the ferreting member having an elongate blade extending rearwardly in aligned parellel relation with said horizontally disposed portion of the plate and in the same plane as the fingers of the ferreting member whereby the tip portion of the fingers which extend horizontally in the plane of the guide can be pressed down against the ground and be drawn forwardly to extend under the crab grass runners, and handle means to which the combination of elements in the described relation is attached.

References Cited in the file of this patent

UNITED STATES PATENTS

| D. 154,303 | Pavlinetz | June 28, 1949 |
| 197,956 | Walker | Dec. 11, 1877 |
| 260,363 | Boyle | July 4, 1882 |
| 845,891 | Prescott | Mar. 5, 1907 |
| 998,661 | Whitaker | July 25, 1911 |
| 1,187,876 | Wester | June 20, 1916 |

FOREIGN PATENTS

| 282,127 | Italy | Feb. 2, 1931 |
| 69,450 | Norway | June 3, 1946 |